(12) United States Patent
Muraoka

(10) Patent No.: US 6,651,092 B1
(45) Date of Patent: Nov. 18, 2003

(54) CABLE MODEM SYSTEM

(75) Inventor: Kazuhiko Muraoka, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/471,421

(22) Filed: Dec. 23, 1999

(30) Foreign Application Priority Data

Dec. 24, 1998 (JP) .......................................... 10-367212

(51) Int. Cl.$^7$ .............................................. G06F 15/16
(52) U.S. Cl. ........................ 709/220; 709/221; 709/222; 709/250
(58) Field of Search ................................. 709/227, 228, 709/221, 245, 242, 220, 222, 250; 370/338, 340, 409, 475, 401; 710/10

(56) References Cited

U.S. PATENT DOCUMENTS

| | | | | |
|---|---|---|---|---|
| 5,884,024 A | * | 3/1999 | Lim et al. ..................... | 710/200 |
| 6,009,103 A | * | 12/1999 | Woundy ....................... | 370/401 |
| 6,023,464 A | * | 2/2000 | Woundy ....................... | 370/352 |
| 6,101,182 A | * | 8/2000 | Sistanizadeh et al. ........ | 370/352 |
| 6,178,455 B1 | * | 1/2001 | Schutte et al. ............... | 709/228 |
| 6,212,563 B1 | * | 4/2001 | Beser ........................... | 709/227 |
| 6,240,464 B1 | * | 5/2001 | Fijolek et al. ............... | 709/250 |
| 6,370,147 B1 | * | 4/2002 | Beser ........................... | 709/222 |
| 6,405,253 B1 | * | 6/2002 | Schutte et al. ............... | 370/397 |
| 6,421,728 B1 | * | 7/2002 | Mohammed et al. ........ | 709/227 |
| 6,466,986 B1 | * | 10/2002 | Sawyer et al. ............... | 709/245 |

OTHER PUBLICATIONS

Droma, R. Dynamic Host Configuration Protocol. RFC 2131. Mar. 1997.*
Srisuresh, P.Load Sharing using IP Network Address Translation. RFC 2391.Aug. 1998.*
Egevang, K.The IP Network Address Translator.RFC 1631. May 1994.*
Droms, "Dynamic Host Configuration Protocol," Bucknell University (Oct. 1993), pp. 1–39.

* cited by examiner

Primary Examiner—Marc D. Thompson
(74) Attorney, Agent, or Firm—Finnegan, Henderson, Farabow, Garrett & Dunner, L.L.P.

(57) ABSTRACT

A system and method are disclosed for managing an assignment of IP addresses in a cable modem system. According to the disclosed system and method, an IP address of a specific kind is assigned to a client according to the classification of the client. A private IP address is issued in case of the client being a cable modem and a global IP address is issued in other cases so that the number of global addresses needed in the cable modem system can be reduced.

10 Claims, 5 Drawing Sheets

CABLE MODEM SYSTEM

BACKGROUND OF THE INVENTION

I. Field of the Invention

The present invention generally relates to a cable modem system comprising a mechanism which dynamically assigns an Internet protocol (IP) address in response to a client request. More particularly, the present invention relates to a cable modem system in which an IP address-assigning mechanism assigns a private address and a global address according to a classification of a requesting client.

II. Background and Material Information

Cable modem systems, which enable digital communication over a coaxial cable network for cable television (CATV), have recently become widespread. The cable modem system realizes high-speed computer communication using the same signal that a regular television system uses, i.e., a radio frequency (RF) signal. In the cable modem system, both television service and digital communication service can be provided to a member via the same cable.

FIG. 3 is an exemplary block diagram showing the configuration of a cable modem system. FIG. 4 is an exemplary block diagram showing the configuration of a cable modem (CM). FIG. 5 is showing exemplary communication between two CMs connected to the same cable.

As shown in FIG. 3, a cable modem system mainly comprises a cable modem terminate system (CMTS) 302, a CM 304, and a CATV cable 306 via which CMTS 302 and CM 304 are connected to each other. CMTS 302 receives data from a provider's network 308, which conforms to a standard for local area networks (LAN) such as 100BASE-T or asynchronous transfer mode (ATM), and transforms the data into an RF signal and vice versa. CM 304 is generally located at a home, for instance, to realize a small office/home office (SOHO). CM 304 is connected to a user computer such as personal computer or workstation (PC/WS) 310 via a user's network 312 conforming to a standard such as 10BASE-T or 100BASE-T.

CMTS 302 and CM 304 enable unsymmetrical high-speed communication in the cable modem system, i.e., communication from CMTS 302 to CM 304 (hereinafter referred to as "downstream communication") at a predetermined rate, e.g., 10 Mbps–40 Mbps and communication from CM 304 to CMTS 302 (hereinafter referred to as "upstream communication") at a predetermined rate, e.g., 1 Mbps–10 Mbps. A plurality of CMs 304a–304b connected to single CATV cable 306 share both the downstream frequency (F1) and the upstream frequency (F2) on CATV cable 306.

As shown in FIG. 4, CM 304a comprises an RF receiver 402 and an RF transmitter 404. CM 304a assists PC/WS 310a in communicating with another user computer 310c connected to another CM 304b, however, CM 304a can not receive an RF signal directly from CM 304b because of the difference in frequencies between the downstream communication and the upstream communication.

Therefore, as shown in FIG.5, CMTS 302 comprises a relay unit 502 which receives a data frame sent from CM 304a and sends it to another CM 304c. Relay unit 502 enables the CATV cable 306 to be treated in the same way as an ethernet LAN and allows the application of techniques used for a regular LAN.

Originally, CM 304 just needed a media access control (MAC) address and did not need an IP address. However, recently, even a hub or a modem has become a mechanism conforming to a network management protocol such as simple network management protocol (SNMP), which requires an IP address, so that a provider's SNMP server can grasp conditions of the hub or the modem and alter their definition information.

Single CM 304 is usually supposed to be assigned to single user. For an operator to manually assign those IP addresses would be a hard task. Therefore, a mechanism conforming to a dynamic host configuration protocol (DHCP) is usually used. A server which comprises the mechanism is called DHCP servers and it dynamically assigns an IP address to a client, such as CM 304 or PC/WS 310, in response to a request from the client.

In the case of a huge cable modem system, the number of CMs 304 is very large, e.g., thousands through ten thousands. Moreover, because CM 304 is usually kept working without being shut off the power, many IP addresses are capable of being held by most CM 304s. Therefore, more IP addresses are required so that the system can efficiently work in this situation.

However, the number of IP addresses is limited and an exhaustion of IP addresses has turned into a grave issue. Therefore, it is difficult to own many IP addresses and costly for a company.

An IP address for accessing to the Internet is also called a "global address". Originally, an "IP address" meant an address used in an IP network, one of which is the Internet. However, "IP address" is now often used to mean just an address used for the Internet. To avoid confusion, an IP address for accessing to Internet will be referred as to "global address" and an IP address other than a "global address" will be referred to as a "private address" in the following.

SUMMARY OF THE INVENTION

In view of the foregoing, the present invention is directed to a system and method for managing an assignment of IP addresses in a cable modem system that substantially obviates one or more of the problems due to limitations and disadvantages of the past approaches.

In accordance with an aspect of the present invention, as embodied and broadly described, the present invention is directed to a cable modem system. The system comprises at least one cable modem, at least one user computer connected to the cable modem, a CMTS, a cable via which the cable modem and the CMTS are connected, and means connected to the CMTS for assigning an IP address of a specific kind according to the classification of a client in response to a request for an IP address from the client.

In accordance with another aspect of the present invention, there is provided a method for managing an assignment of IP addresses in a cable modem system. The method comprises issuing a request for an IP address by a client and issuing an IP address of a specific kind according to the classification of the client by a server.

It is to be understood that both the foregoing general description and the following detailed description are exemplary and explanatory only and are not restrictive of the invention, as claimed. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and/or features of the invention and together with the description, serve to explain the principles of the invention. In the drawings.

DETAILED DESCRIPTION

The various aspects and features of the present invention will be hereinafter described with reference to the accompanying drawings.

Figure 1:
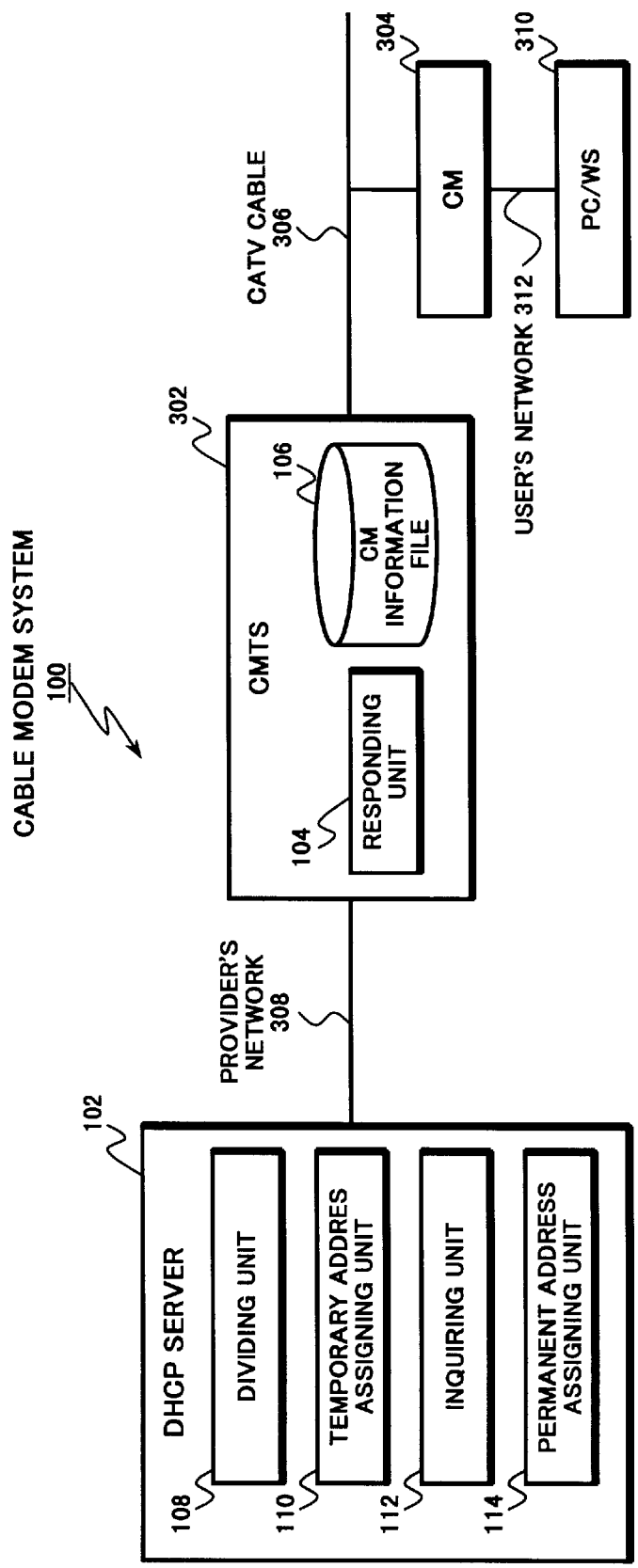
FIG. 1 is an exemplary block diagram showing the configuration of a cable modem system 100, according to the principles of the present invention.
Figure 3:
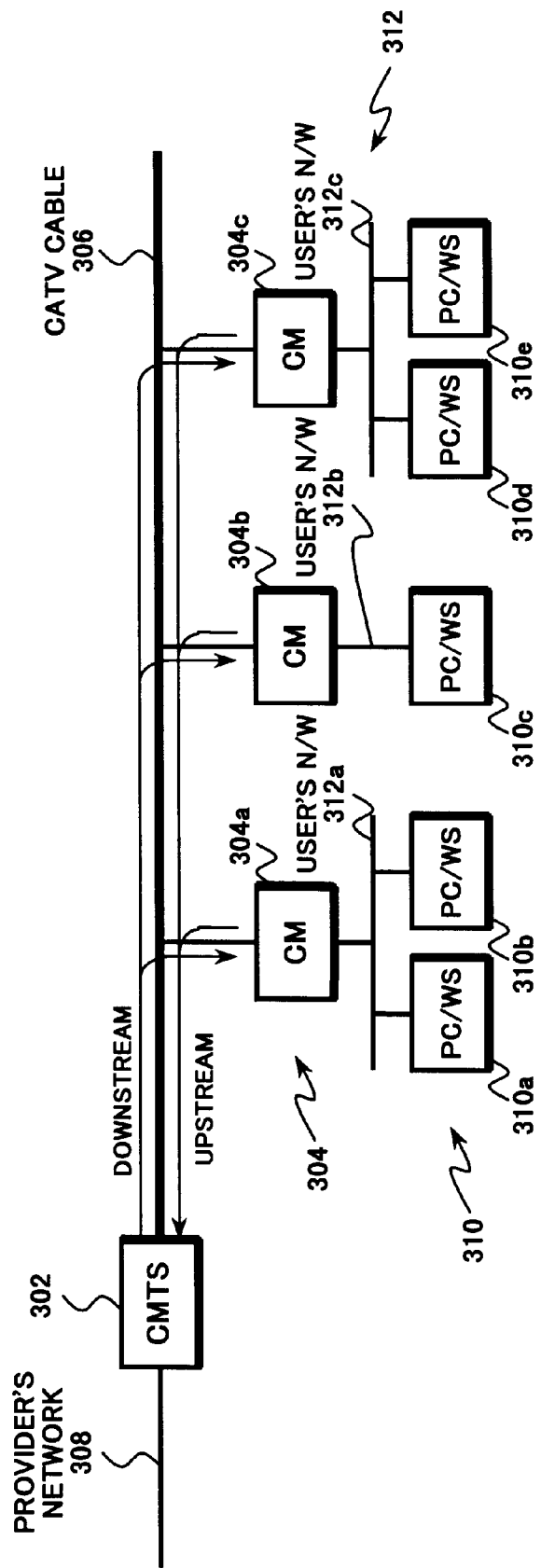
FIG. 3 (prior art) is an exemplary block diagram showing the configuration of a cable modem system.
Figure 4:
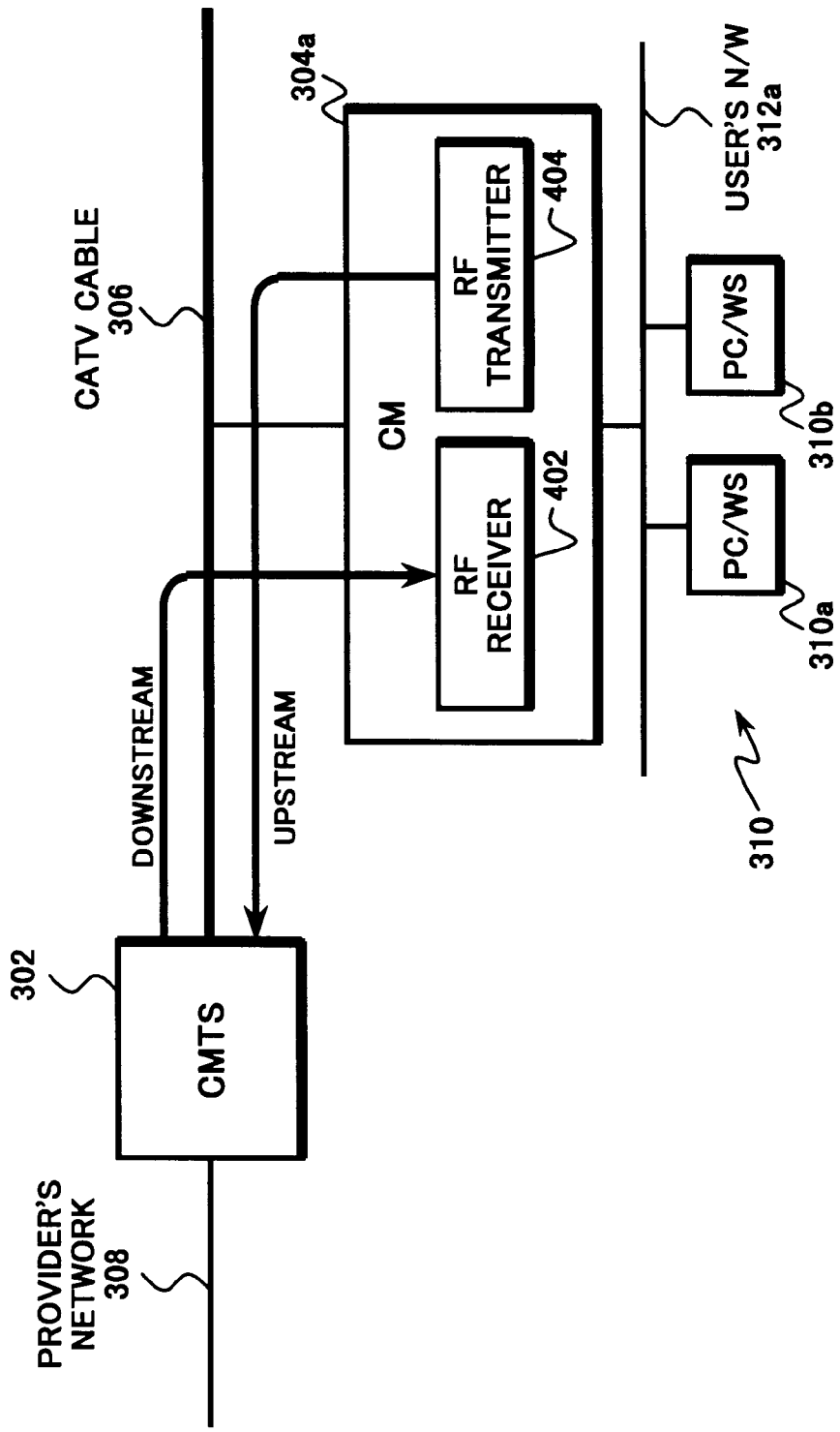
FIG. 4 (prior art) is an exemplary block diagram showing the configuration of a CM.
Figure 5:
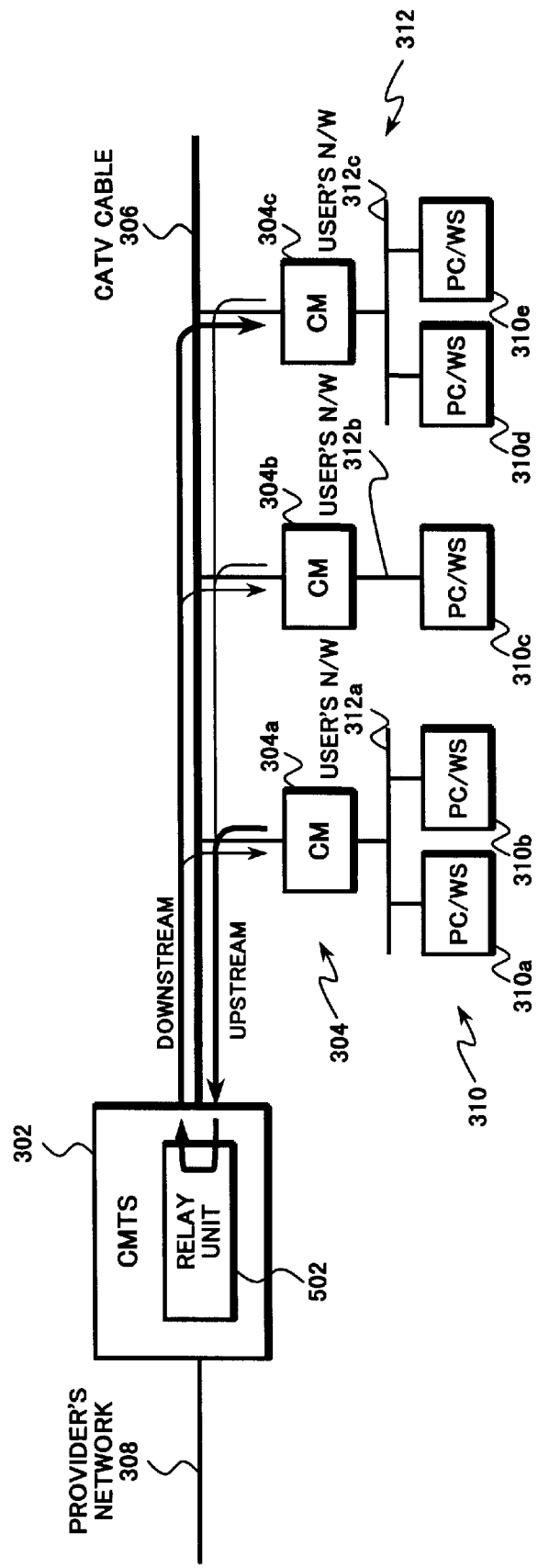
FIG. 5 (prior art) is showing communication between two CMs connected to the same cable.

FIG. 1 is an exemplary block diagram showing the configuration of a cable modem system 100 according to the present invention. Explanations regarding the same elements that are already explained referring to FIG. 3–FIG. 5 will be omitted in the following.

Cable modem system 100 is the system explained in the Background and Material Information section additionally provided with an IP address assigning mechanism. A DHCP server 102 is provided, connecting to both Provider's network 308 and an unshown gateway to the Internet as an apparatus for dynamically assigning IP addresses. CMTS 302 comprises a responding unit 104 and a CM information file 106. CM information file 106 stores a list of MAC address of every operating CM 304.

DHCP server 102 is a server computer which works according to the DHCP and dynamically assigns an IP address to a client such as CM 304 or PC/WS 310 when each of them starts up. DHCP server 102 comprises a dividing unit 108, a temporary address assigning unit 110, an inquiring unit 112, and a permanent address assigning unit 114.

Dividing unit 108 judges if a request from a client is a first request using a list of issued temporary addresses stored in Temporary address assigning unit 110.

Temporary address assigning unit 110 assigns a temporary address to both CM 304 and PC/WS 310. Term of validity of the temporary address is set by DHCP server 102 to a comparatively short time, for instance, 1–10 minutes.

Inquiring unit 112 requests CMTS 302 for property information on the client which is assigned with a temporary address.

A client assigned with a temporary address requests DHCP server 102 for another IP address when the term of validity expires. Permanent address assigning unit 114 issues a permanent address in response to this request. Term of validity of the permanent address is set by DHCP server 102 to a comparatively long time, for instance, 1 hour–1 day.

When a requesting client is PC/WS 310, permanent address assigning unit 114 assigns the client a global address. When a requesting client is CM 304, permanent address assigning unit 114 assigns the client a private address. A private address may be decided in a self-serving manner as far as form, because it is not used for access to the Internet.

CMTS 302 working as a bridge controls CM 304 and retains information regarding CM 304 including a media access control (MAC) address.

Responding unit 104 refers to CM information file 106 and sends information if a client is a CM to DHCP server 102 on receiving an inquiry.

Figure 2:
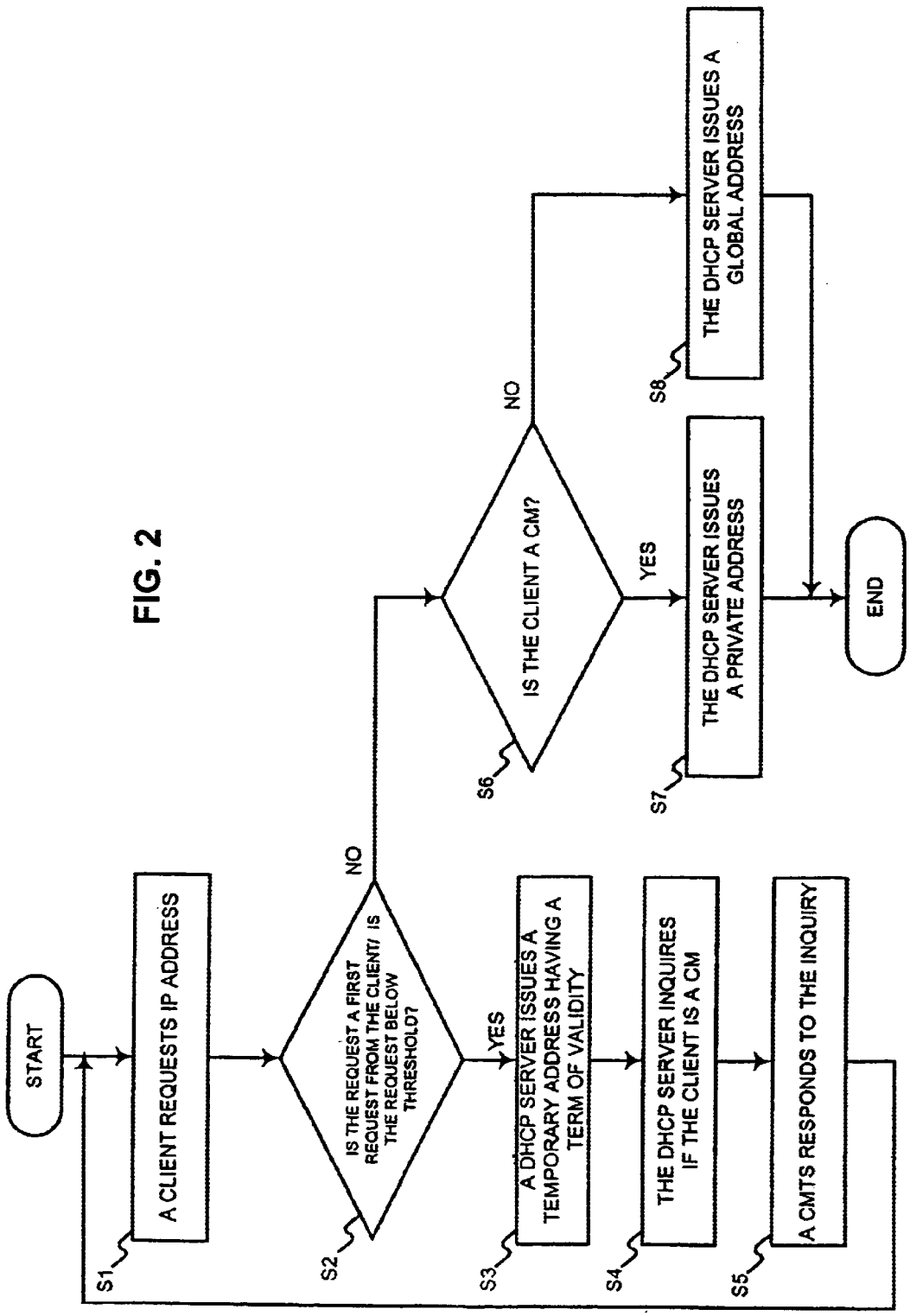
FIG. 2 is an exemplary flowchart showing an action of Cable modem system 100.

FIG. 2 is an exemplary flowchart showing an operation of cable modem system 100.

At first, a client, e.g., CM 304 or PC/WS 310, issues a request (hereinafter referred to as a "DHCP request") to DHCP server 102 for an IP address when the client starts up (step S1). At that time, DHCP server 102 obtains a MAC address of the client in a conventional manner, as is known in the art. For example, see "Dynamic Host Configuration Protocol by R. Droms (1993)"

Dividing unit 108 judges if a request from a client is a first request using a list of issued temporary addresses stored in temporary address assigning unit 110 (step S2). The threshold for assigning a permanent address may be shifted to a larger number of requests.

When the request is a first request from the client, temporary address assigning unit 110 assigns a private address as a temporary address and sends the address to the client (step S3). The term of validity of the temporary address must be longer than a term required by inquiring unit 112 to get the information regarding a classification of the client from CMTS 302.

Inquiring unit 112 inquires if the client is a CM 304 or another apparatus, for instance, PC/WS 310 (step S4), by sending the MAC address obtained at the step S1 to CMTS 302.

Responding unit 104 checks with CM information file 106, judges if the client is CM 304 or not, and replies with the result to DHCP server 102 (step S5). Returning to the start, DHCP server 102 waits fr a next request.

The term of the temporary address given to the client in the step S3 expires, e.g., 1–10 minutes later. And the client issues another DHCP request (step S1).

When the request is a second request (step S2), permanent address assigning unit 114 checks with the reply from responding unit 104 whether the client is a CM (step S6).

When permanent address assigning unit 114 judges the client is a CM 304, permanent address assigning unit 114 assigns the client a private address as a permanent address. Because CM 304 itself does not access the Internet, a private address is enough for CM 304 to work in a local IP network (step S7).

When permanent address assigning unit 114 judges the client is a PC/WS 310, permanent address assigning unit 114 assigns the client a global address as a permanent address because the client tends to require access to the Internet (step S8).

Thus, permanent address assigning unit 114 assigns one of a global address or a private address as a permanent address according to the classification of the requesting client.

As described above, consistent with the principles of the present invention, a client is classified as one of two types, namely, a CM 304 or something others such as PC/WS 310. PC/WS 310 is assigned a global address and CM 304 is assigned a private address. This has the effect in a cable modem system of reducing the number of global addresses to a number equal to the member of PC/WS. Therefore the cable modem system can efficiently work despite using fewer IP addresses.

Further, consistent with the principles of the present invention, a temporary address is assigned in response to a first request for an IP address and a permanent address is assigned in response to a second request for an IP address. As a result, the system can secure enough time for checking if the requesting client is a CM 304.

Other embodiments of the present invention will be apparent to those skilled in the art from consideration of the specification and practice of the invention disclosed herein. It is intended that the specification and examples be considered as exemplary only, with a true scope and spirit of the present invention being indicated by the following claims.

What is claimed is:

1. A cable modem system, comprising:
    at least one cable modem (CM);
    at least one user computer connected to the cable modem;
    a cable modem terminate system (CMTS);
    a cable via which the at least one cable modem and the CMTS are connected; and
    means coupled to the CMTS for assigning, in response to a request from a client, a private IP address to the client when the client is a cable modem and a global IP address to the client when the client is a user computer, said IP address assigning means including:
        means for determining whether the request is a first request from the client,
        means for issuing to the client, when the request is the first request, a temporary IP address having a term of validity of a sufficient duration to enable the IP address assigning means to determine whether or not the client is a cable modem before said term of validity expires, and
        inquiring means for sending an inquiry, including a media access control (MAC) address of the client, to the CMTS to determine whether the client is a cable modem.

2. The system of claim 1, wherein the IP address assigning means includes means for dividing requests according to a number of requests from the same client before the request.

3. The system of claim 1, wherein the CMTS includes:
    a CM information file; and
    means for responding which determines if the client is cable modem using the CM information file in response to the inquiry from the inquiring means.

4. The system of claim 1, wherein the private and global IP addresses are nontemporary IP addresses.

5. A method for managing an assignment of IP addresses in a cable modem system, comprising the steps of:
    a. issuing, by a client, a first request for an IP address to a server;
    b. issuing, via the server, a temporary IP address to the client in response to the first request;
    c. determining, via the server, whether the client is a cable modem after issuing the temporary IP address to said client;
    d. issuing, by the client, a subsequent request for an IP address to the server; and
    e. issuing, via the server and in response to the subsequent request, a non-temporary private IP address to the client when the client is determined to be a cable modem and a non-temporary global IP address to the client when the client is determined not to be a cable modem, wherein step e. comprises:
    establishing a threshold number;
    issuing the non-temporary private or public IP address when the subsequent request is a request issued after issuance of the threshold number of requests by the client; and
    issuing a temporary IP address to the client when the subsequent request is a request issued before said threshold number of requests are issued.

6. A method for managing an assignment of IP addresses in a cable modem system, comprising:
    issuing, by a client, a first request for an IP address to a server;
    issuing, via the server, a temporary IP address to the client in response to the first request;
    determining, via the server, whether the client is a cable modem after issuing the temporary IP address to said client;
    issuing, by the client, a subsequent request for an IP address to the server; and
    issuing, via the server and in response to the subsequent request, a non-temporary private IP address to the client when the client is determined to be a cable modem and a non-temporary global IP address to the client when the client is determined not to be a cable modem,
    wherein said issuing, via the server, a temporary IP address comprises issuing a temporary IP address having a term of validity of a sufficient duration to enable the server to determine whether or not the client is a cable modem before said term of validity expires.

7. The method of claim 6, further comprising checking how many requests were issued before the subsequent request from the client.

8. The method of claim 6, wherein determining whether the client is a cable modem comprises determining whether the client is a cable modem using a MAC address of the client.

9. The method of claim 6, wherein the subsequent request for an IP address is issued by the client before expiration of the term of validity of the temporary IP address.

10. An apparatus for assigning an IP address in response to a request from a client, comprising:
    means for dividing requests according to the number of requests from the same client before the request;
    means for issuing a temporary IP address when the request is a first request from the client;
    means for issuing a nontemporary IP address when the request is a subsequent request from the client according to a classification of the client; and
    means for inquiring as to whether the client is a cable modem using a media access control (MAC) address of the client,
    wherein the means for issuing a nontemporary IP address issues a private IP address when the client is a cable modem and issues a global address when the client is not a cable modem, and wherein the temporary IP address has a term of validity of a sufficient duration to enable the inquiring means to determine whether or not the client is a cable modem before said term of validity expires.

* * * * *